United States Patent
Tobo

(10) Patent No.: US 8,915,459 B2
(45) Date of Patent: Dec. 23, 2014

(54) FISHING REEL

(76) Inventor: Takehito Tobo, Imizu (JP)

( * ) Notice: Subject to any disclaimer, the term of this patent is extended or adjusted under 35 U.S.C. 154(b) by 38 days.

(21) Appl. No.: 13/819,710

(22) PCT Filed: Aug. 30, 2010

(86) PCT No.: PCT/JP2010/064720
§ 371 (c)(1),
(2), (4) Date: Feb. 27, 2013

(87) PCT Pub. No.: WO2012/029107
PCT Pub. Date: Mar. 8, 2012

(65) Prior Publication Data
US 2013/0161436 A1    Jun. 27, 2013

(51) Int. Cl.
| | |
|---|---|
| *A01K 89/01* | (2006.01) |
| *A01K 89/015* | (2006.01) |
| *A01K 89/016* | (2006.01) |
| *A01K 89/017* | (2006.01) |
| *A01K 89/033* | (2006.01) |

(52) U.S. Cl.
CPC ............. *A01K 89/015* (2013.01); *A01K 89/016* (2013.01); *A01K 89/017* (2013.01); *A01K 89/033* (2013.01)
USPC .......................... 242/251; 242/388.7; 242/317

(58) Field of Classification Search
USPC ............... 242/251, 254, 317, 323, 388.7, 350
See application file for complete search history.

(56) References Cited

U.S. PATENT DOCUMENTS

| | | | | |
|---|---|---|---|---|
| 1,654,667 A | * | 1/1928 | Russell | 242/310 |
| 2,124,524 A | * | 7/1938 | Case | 242/254 |

(Continued)

FOREIGN PATENT DOCUMENTS

| | | |
|---|---|---|
| FR | 2452247 A1 | 10/1980 |
| JP | 2-199325 A | 8/1990 |

(Continued)

OTHER PUBLICATIONS

International Search Report (ISR) dated Nov. 22, 2010 (and English translation thereof) issued in parent International Application No. PCT/JP2010/064720.

(Continued)

*Primary Examiner* — Emmanuel M Marcelo
(74) *Attorney, Agent, or Firm* — Holtz, Holtz, Goodman & Chick PC

(57) ABSTRACT

A fishing reel comprises a spool 14 which is provided in a rotatable manner with respect to a reel body 12, and around which a fishing line 24 is wound, and a winding mechanism 18 which is provided coaxially with the spool 14. Between the spool 14 and winding mechanism 18, a drag part 16, which transmits rotation of the winding mechanism 18 to the spool 14 at or below a predetermined torque, is provided. The winding mechanism 18 is provided with a power transmission member 44 provided coaxially with a main rotation shaft 30 which rotates with the spool 14 via a one-way clutch 40. A winding ring 45 provided coaxially with the power transmission member 44, a winding cord 47 whose one end is fixed to the winding ring 45, and which is wound around the winding ring 45, and a spiral spring 46 which rotates the power transmission member 44 in a rewinding direction are provided. By pulling out the winding cord 47, the winding ring 45 is rotated and the spool 14 is rotated as one unit, and the fishing line 24 is wound. The winding ring 45 is rotated with the spiral spring 46 in a rewinding direction, and the winding cord 47 is rewound around the winding ring 45 with the one-way clutch 40 without torque being transmitted to the spool 14.

3 Claims, 3 Drawing Sheets

(56) References Cited

U.S. PATENT DOCUMENTS

| | | | | |
|---|---|---|---|---|
| 2,572,354 A | * | 10/1951 | King | 242/253 |
| 2,672,217 A | * | 3/1954 | Sarah | 242/254 |
| 2,708,079 A | * | 5/1955 | Sarah | 242/254 |
| 2,942,800 A | * | 6/1960 | Torbett | 242/252 |
| 3,506,214 A | * | 4/1970 | Laszlo | 242/254 |
| 3,963,190 A | * | 6/1976 | Wilson | 242/564.1 |
| 4,346,857 A | | 8/1982 | Moll | |
| 4,720,056 A | * | 1/1988 | Danielsson | 242/303 |
| 5,323,983 A | * | 6/1994 | Campion | 242/371 |
| 5,368,248 A | * | 11/1994 | Walacavage | 242/283 |
| 6,921,040 B2 | * | 7/2005 | Watari | 242/388.7 |

FOREIGN PATENT DOCUMENTS

| | | |
|---|---|---|
| JP | 9-168354 A | 6/1997 |
| JP | 2006-223219 A | 8/2006 |
| JP | 2010-207138 A | 9/2010 |

OTHER PUBLICATIONS

International Preliminary Report on Patentability (IPRP) including Written Opinion (and English translation thereof) dated Mar. 21, 2013 in parent International Application No. PCT/JP2010/064720.
Extended European Search Report dated Jan. 24, 2014 in counterpart European Application No. 10856660.5.

* cited by examiner

FISHING REEL

TECHNICAL FIELD

The present invention relates to a fishing reel, which controls rotational motion of a spool for winding a fishing line by using a one-way clutch.

BACKGROUND ART

Conventionally, a fishing reel rotates a spool for winding a fishing line with a drive motor or a handle. Between a handle and a spool, a clutch mechanism which transmits or interrupts a rotational force, a drag mechanism which acts a resistive force upon rotation, and a one-way clutch mechanism which permits rotation only in one direction are provided to control the spool rotation according to fishing motion.

For example, in a fishing reel disclosed by patent document 1, a spool is rotatably supported between both side plates of a real body, and a handle shaft is rotatably supported on the outer periphery of one side plate. A handle is fixed to the handle shaft via a first one-way clutch which transmits a rotational force only in one direction, so that a spool is rotated only in a fishing line winding direction via a power transmission mechanism by rotating the handle. Further, an external frame which fixes an electric motor to a reel body is removably mounted, and a second one-way clutch which transmits a rotational force only in the same direction as a first one-way clutch is fixed to the handle shaft, whereby a rotational force of the electric motor is transmitted to the handle shaft via the second one-way clutch.

Similar to the fishing reel disclosed by the patent document 2, there is a fishing reel in which a spool for winding a fishing line is rotatable with respect to a reel body, and which is provided with a handle, a rotation shaft, a drag mechanism, a one-way clutch mechanism, and a second rotation prevention mechanism. A drag mechanism is provided with a main drive part which rotates with a spool as one piece, and a driven part which receives rotation transmitted from a main drive part, rotates with a ration shaft, and acts a rotational resistance upon a main drive part, and is configured to transmit rotation between a spool and a rotation shaft. A one-way clutch mechanism is disposed between a rotation shaft and a reel body, and is configured to permit rotation in a fishing line winding direction with respect to a rotation shaft, and prevent rotation in a fishing line let-out direction until reaching a predetermined limit set to be smaller than a maximum preset rotational resistance of a drag mechanism, while permitting the rotation after reaching the limit. A second rotation prevention mechanism is disposed between a rotation shaft and a reel body, and is configured to permit rotation in a fishing line winding direction with respect to a rotation shaft, and prevent rotation in a fishing line let-out direction when a one-way clutch mechanism permits the rotation.

PRIOR ART LITERATURE

Patent Documents

Patent Document 1: Japanese Patent Application Laid-open No. 2006-223219
Patent Document 2: Japanese Patent Application Laid-open No. 9-168354

SUMMARY OF THE INVENTION

Problems to be Solved by the Invention

In the fishing reel described in the background art, a fishing line is wound by rotating a handle and a motor, and a gear mechanism is required to increase a rotation speed of a spool with respect to a rotation speed of a handle. This complicates the structure and increases the weight. Further, a handle is required to do small and quick rotation, decreasing the usability.

The present invention has been made in order to solve the problems of the background art. Accordingly, it is an object of the present invention to provide a fishing reel with a simple structure, which can efficiently and quickly wind a fishing line.

Means for Solving the Problem

The present invention provides a fishing reel comprising a reel body, and a spool which is provided in a rotatable manner with respect to the reel body, and around which a fishing line is wound, comprises a winding mechanism provided coaxially with the spool, the winding mechanism comprising: a power transmission member provided coaxially with a main rotation shaft which rotates with the spool via a one-way clutch; a winding ring provided coaxially with the power transmission member; a winding cord whose one end is fixed to the winding ring, and which is wound around the winding ring; and a spiral spring which rotates the power transmission member in a rewinding direction, wherein a drag part which transmits rotation of the winding mechanism to the spool at or below a predetermined torque is provided between the spool and the winding mechanism, and the winding ring is rotated and the spool is rotated by pulling out the winding cord, the winding ring is rotated with the spiral spring in a rewinding direction after the fishing line is wound, and the winding cord is rewound around the winding ring with the one-way clutch without torque being transmitted to the spool.

A first drag part which sets an upper limit of a winding torque of the fishing line is provided between the main rotation shaft and the spool which are rotated with the winding mechanism, a drag adjustment knob, which adjusts a pressing force of a drag pad in the first drag and sets an upper limit of a winding torque, is provided, a rotation adjustment shaft is provided on the main rotation shaft across a fixing shaft, and a second drag part which sets an upper limit of tension applied to the fishing line is provided between the rotation adjustment shaft and the reel body.

The drag part comprises a drag disc provided coaxially with the main rotation shaft, and a plurality of drag pads disposed opposite to the drag disc. The spiral spring, power transmission member, and winding ring are combined in one unit.

Effect of the Invention

The fishing reel with a simple structure according to the present invention permits quick winding of a fishing line, and offers enjoyment of timely fishing without missing timing. In addition, the action of pulling a winding cord is straight and wide without frequently turning a handle as in a conventional fishing reel, and a fishing line can be wound more quickly.

MODE FOR CARRYING OUT THE INVENTION

Figure 1:
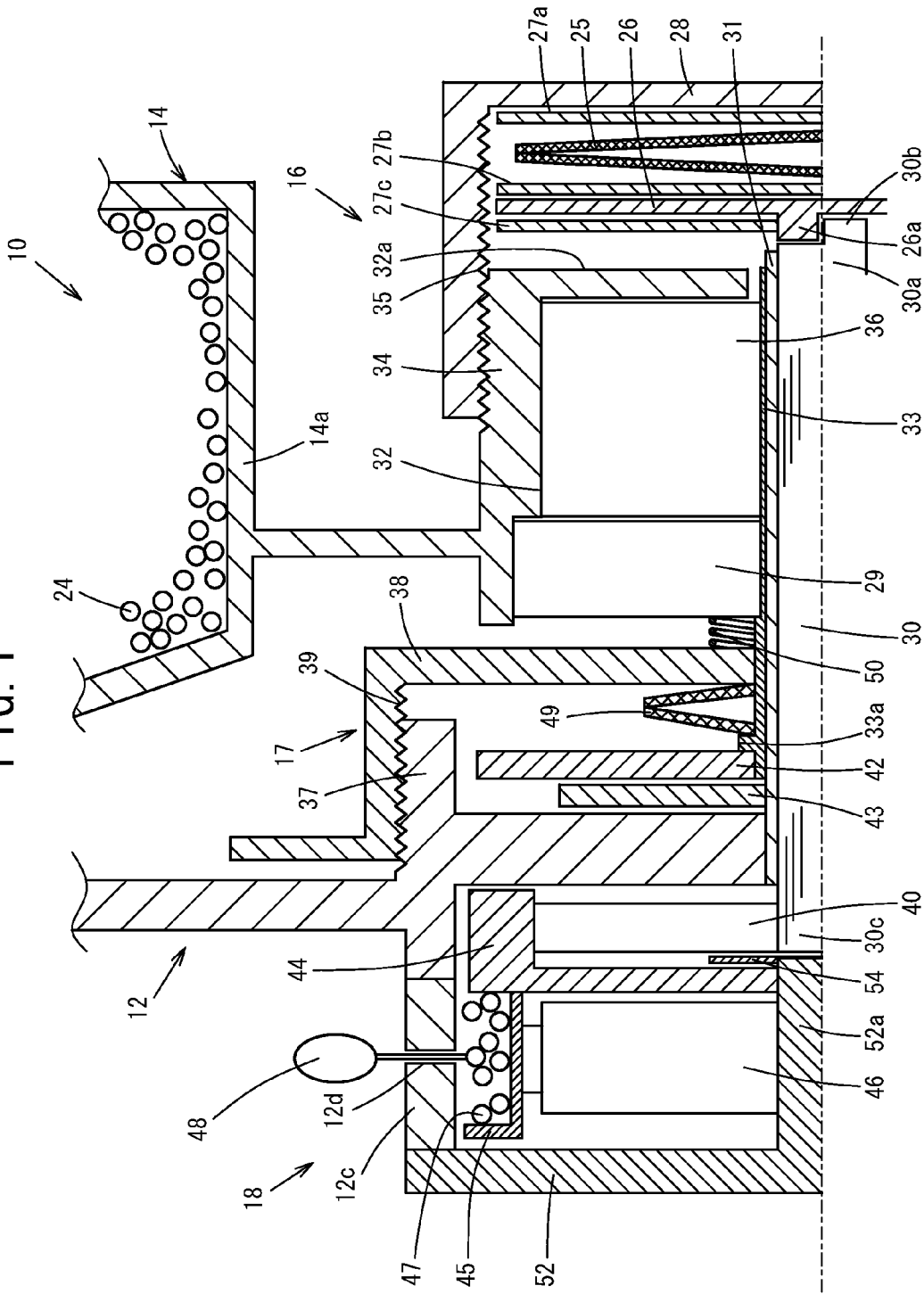
FIG. 1 is a fragmentary sectional view of a fishing reel of an embodiment of the present invention.
Figure 2:
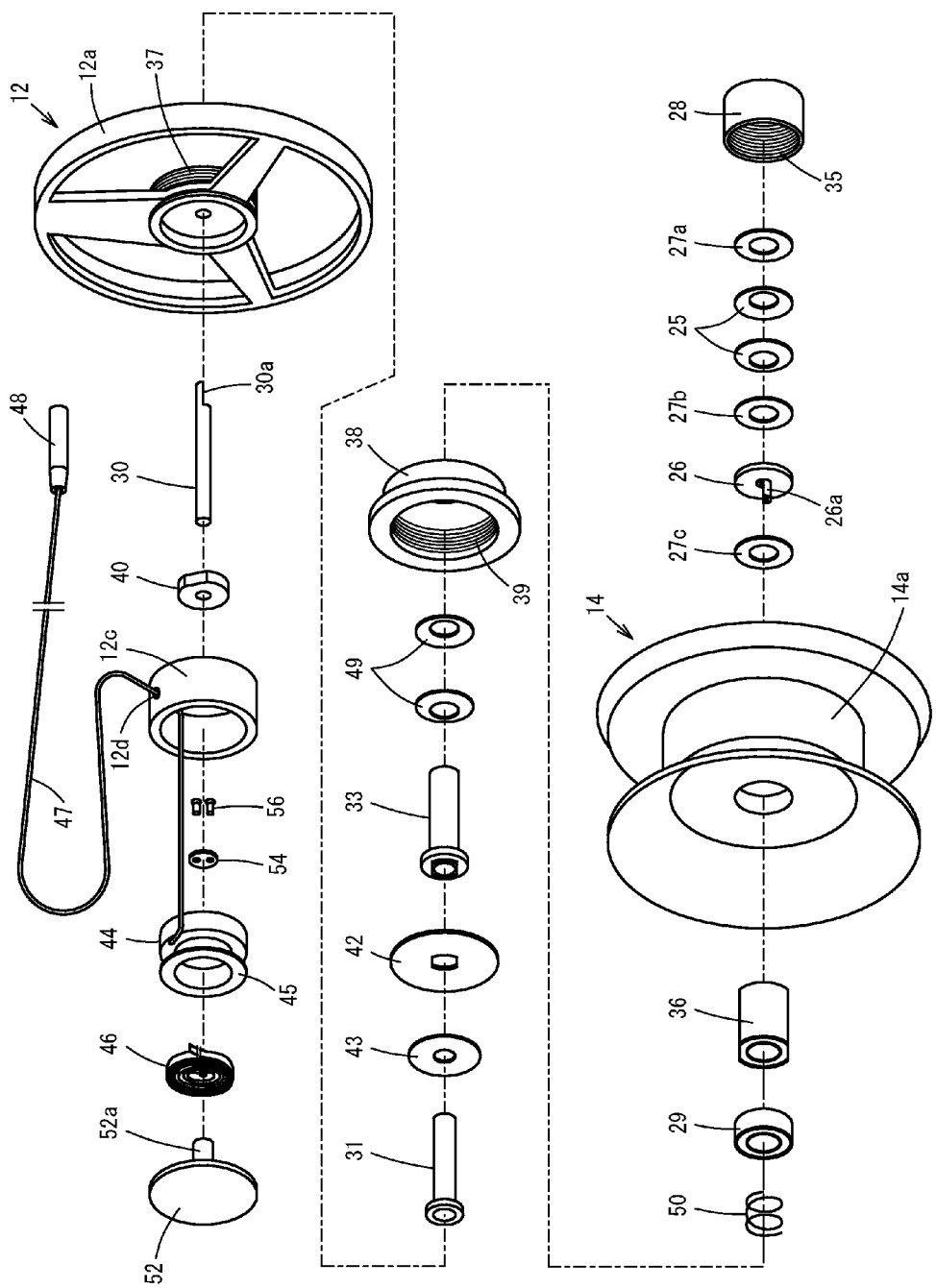
FIG. 2 is an exploded perspective view of a fishing reel of an embodiment of the present invention.
Figure 3:
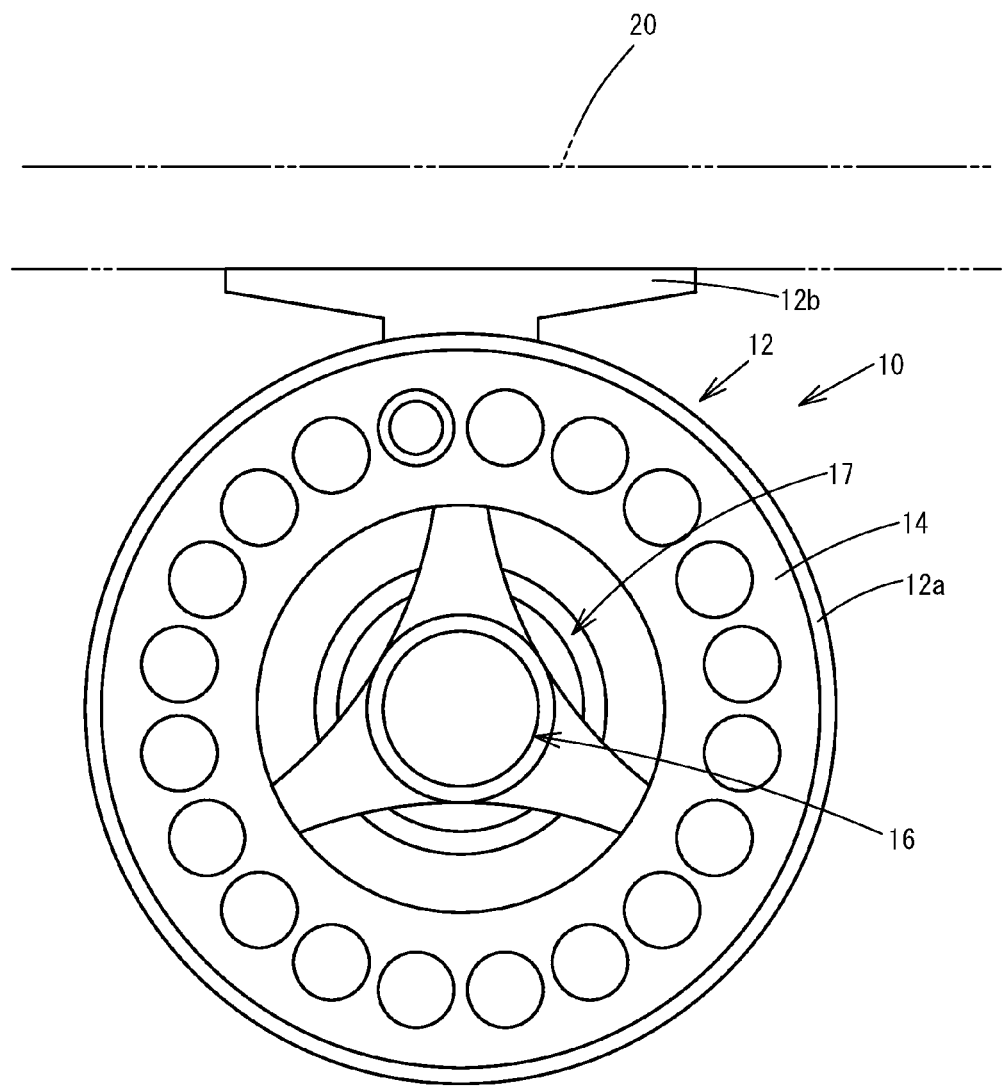
FIG. 3 is a front view of a fishing reel of an embodiment of the present invention.

Hereinafter, an embodiment of the present invention will be described with reference to the accompanying drawings. FIGS. 1 to 3 shows an embodiment of the present invention. A fishing reel 10 comprises a reel body 12, a spool 14 disposed lateral to the reel body 12, a first drag part 16 provided inside and coaxially with the spool 14, a second drag part 17 provided lateral to and coaxially with the spool 14, and a winding mechanism 18 provided lateral to the second drag part 17 and coaxially with the spool 14.

The reel body 12 comprises a circular frame 12a, and an attaching part 12b that is provided in one piece with the frame 12a and is fixed to a fishing rod 20. In the spool 14 disposed lateral to the frame 12a, the first drag part 16 is disposed inside the spool winding part 14a for winding a fishing line 24, coaxially with, and in one piece with the spool.

The first drag part 16 is provided with a drag disc 26, which is provided coaxially with the spool 14 and transmits rotation of a one-way clutch 40 of a winding mechanism 18, is provided at one end portion 30a of a main rotation shaft 30 in an engaged manner to prevent a relative rotation. The engagement is formed by tightly contacting an axial plane surface of a semicircular projection 26a provided at the center of the drag disc 26 and an axial plane surface of a semicircular projection 30b formed at one end portion 30a of the main rotation shaft 30.

The outer side of the drag disc 26 is disposed inside a cylindrical drag adjustment knob 28 of the first drag part 16 via two pieces of disc-shaped spring member 25 held between drag pads 27a and 27b made of a smooth fluororesin sheet. Thus, a spring force of the spring member 25 can be applied to the side of the drag disc 26. The inner side of the drag disc 26 is provided slidably with respect to a side 32a of a bearing housing 32 of the spool 14 via a drag pad 27c inserted between them.

A female screw 35 is cut on the inner periphery of the drag adjustment knob 28. The female screw 35 engages with a male screw 34 cut on the outer periphery of the cylindrical bearing housing 32 that is provided coaxially in one piece with and projected from a side of the spool 14. Thus, by rotating the drag adjustment knob 28, a sliding pressure of the drag disc 26 and drag pads 27a, 27b, and 27c is adjusted, and a transmission torque between the rotation shaft 30 and drag disc 26 can be adjusted.

A fixing shaft 31 fixed to the reel body 14 is inserted into the main rotation shaft 30, and a rotation adjustment shaft 33 is rotatably inserted into the fixing shaft 31. An inner ring part of a one-way clutch 36 housed in the housing 32 formed in the spool 14 is fixed to the rotation adjustment shaft 33. An outer ring part of the one-way clutch 36 is fixed inside the housing 32 of the spool 14. The inner ring part of the one-way clutch 36 is formed in one piece with the rotation adjustment shaft 33, rotates freely in a forward direction or a direction of winding a fishing line 24 of the spool 14, and prevents rotation of the spool 14 in a reverse direction. In the housing 32 of the spool 14, an inner ring part of a bearing 29 provided between the rotation adjustment shaft 33 and spool 14 is fixed to the rotation adjustment shaft 33, and an outer ring part of the bearing 29 is fixed inside the housing 32, and stabilizes rotation of the spool 14.

A drag adjustment knob 38 of the second drag part 17 is inserted into the rotation adjustment shaft 33. On the inner periphery of the cylindrical drag adjustment knob 38, a female screw 39 that engages with a male screw 37 cut coaxially in the central part of the reel body 12 is provided. The inside of the male screw 37 is shaped cylindrical, and a space is provided inside the drag adjustment knob 38 and the male screw 37 of the reel body 12. Inside the drag adjustment knob 38 providing the space, a drag disc 42 that adjusts transmission of the torque of the rotation adjustment shaft 33 is provided coaxially with the main rotation shaft 30 and fixed to the distal end portion of the rotation adjustment shaft 33. One side of the drag disc 42 faces the inside of the central part of the reel body 12 across a drag pad 43 made of a smooth fluororesin sheet, and is provided in the reel body 12 and cylindrical drag adjustment knob 38.

On the other side of the drag disc 42 fixed to the rotation adjustment shaft 33, two pieces of disc-shaped spring member 49 are disposed opposite to the inside of the drag adjustment knob 38 via two pieces of disc-shaped spring member 49 inserter between them. One end face of the spring member 49 contacts a flange 33a disposed at the front end portion of the rotation adjustment shaft 33 inside the drag adjustment knob 38, and the other end face contacts the inner surface of the drag adjustment knob 38. Thus, the drag disc 42 and drag pad 43 are biased to the side of the central part of the reel body 12 via the rotation adjustment shaft 33. Further, the one-way clutch 36 prevents inverse rotation of the spool 14, and the drag disc 42 and drag pad 43 slips at or above a predetermined torque to permit inverse rotation of the spool 14.

A coil spring 50 is provided between the outer surface of the drag adjustment knob 38 and the inner ring part of the bearing 29 in the central part of the spool 14. The coil spring biases the spool 14 to be separated from the reel body 12, stabilizes rotation of the spool 14.

A winding mechanism 18 is provided on the side of the reel body 12 opposite to the second drag part 17. In the winding mechanism 18, the other end of the main rotation shaft 30 rotatable with respect to the reel body 12 is disposed, the inner ring part of the one-way clutch 40 is inserted into the other end 30c in a non-rotatable manner, and the outer ring part of the one-way clutch 40 is fixed to the cylindrical power transmission member 44. The power transmission member 44 is provided coaxially with and rotatably as one piece with the main rotation shaft 30, and a winding ring 45 is provided in one piece with the power transmission member 44 on the peripheral edge portion.

The power transmission member 44 and winding ring 45 are contained in the housing 12c provided in one unit with the reel body 12. A spiral spring 46 for rewinding is provided inside the winding ring 45, and a winding cord 47 is wound around the outer periphery of the winding ring 45. One end of the winding cord 47 is fixed to the winding ring 45, and the other end is extended outside the housing 12c via a through-hole 12d formed in the housing 12c. A holding member 48 for facilitating operation as described later is fixed to the other end of the winding cord 47. The diameter of the winding ring 45 is made smaller than, for example, about ½ of the spool 14.

A cap member 52 is fit to the open end on the outer side of the cylindrical housing 12c, a central shaft 52a of the cap member 52 is inserted into the central part of the spiral spring 46, and engaged with the central part of the power transmission member 44. A holding member 54 is provided in the central part of the power transmission member 44 close to the one-way clutch 40. The holding member 54 and screw 56 combine the power transmission member 44 and spiral spring 46 into one unit.

Next, a method of using the fishing reel 10 of this embodiment will be explained. The fishing reel 10 of this embodiment is used for fly-fishing, for example, and facilitates operation of winding a fishing line 24. In other words, when winding a fishing line 24 after a fish bites at a hook of a fishing line 24, for example, if pulling the holding member 48, the winding cord 47 is pulled out of the winding ring 45, and the winding ring 45 rotates by the pulled length of the winding cord 47. The rotation speed is the quotient obtained by dividing the length of the winding cord 47 by the circumference of the winding ring 45. At this time, the length of the fishing line 24 wound around the spool 14 is proportional to the ratio of the diameter of the spool 14 to the diameter of the winding ring 45.

In regard to the operation of winding the fishing line 24 with the winding mechanism 18, when the winding cord 47 is pulled, the power transmission member 44 rotates with rotation of the winding ring 45, the one-way clutch 40 rotates with the power transmission member 44, the rotation shaft 30 rotates as one unit via the one-way clutch 40. Thus, the drag disc 26 rotates, the rotation is transmitted to the drag adjustment knob 28 via the drag pads 27a, 27b and 27c, and the spool 14 rotates. As to the torque transmitted at this time, an upper limit is set by a transmission torque between the drag disc 26 and drag pad 27. A maximum transmission torque at this time is determined by the degree of tightening the female screw 35 of the drag adjustment knob 28 and the male screw 34 of the spool 14.

When the torque applied to the spool 14 by the tension of the fishing line 24 exceeds the transmission torque between the drag disc 42 and drag pad 43, the spool 14 rotates in the pulling-out direction by the tension of the fishing line 24, and prevents a break of the fishing line 24.

When pulling out the winding cord 47 to the end, the spiral spring 46 is wound, and rotational energy is stored. When loosening the winding cord 47, the winding cord 47 is wound around the winding ring 45 with the spiral spring 46. At this time, rotation is transmitted from the power transmission member 44 to the one-way clutch 40, but torque is not transmitted to the main rotation shaft 30 due to the one-way clutch 40, and the spool 14 is kept in being stopped. The torque of the spool 14 in the inverse rotating direction is determined by the torque of the frictional resistance between the drag disc 42 and the drag pad 43. The torque between the drag disc 26 and the drag pads 27a, 27b and 27c has determined a maximum torque transmitted from winding mechanism 18 with the winding cord 47.

According to the fishing reel of this embodiment, it is possible to quickly wind a fishing line with a simple structure, and to enjoy fishing without missing the timing when a fish bites a hook. The operation of pulling a fishing line is straight and wide, enables speedy winding without frequently turning a handle as in a conventional fishing reel.

DESCRIPTION OF A REFERENCE 10 fishing reel
12 reel body
14 spool
14a spool winding part
16 first drag part
17 second drag part
18 winding mechanism
24 fishing line
26, 42 drag disc
27a, 27b, 27c, 43 drag pad
30 main rotation shaft
31 fixing shaft
33 rotation adjustment shaft
36, 40 one-way clutch
44 power transmission member
45 winding ring
46 spiral spring
47 winding cord
48 holding member

The invention claimed is:

1. A fishing reel comprising:
a reel body;
a spool which is provided in a rotatable manner with respect to the reel body, and around which a fishing line is wound;
a winding mechanism provided coaxially with the spool, the winding mechanism comprising:
a power transmission member provided coaxially with a main rotation shaft which rotates with the spool via a one-way clutch;
a winding ring provided coaxially with the power transmission member;
a winding cord whose one end is fixed to the winding ring, and which is wound around the winding ring; and
a spiral spring which rotates the power transmission member in a rewinding direction;
a first drag part which transmits rotation of the winding mechanism to the spool at or below a predetermined torque, the first drag part setting an upper limit of a winding torque of the fishing line and being provided between the main rotation shaft and the spool which are rotated with the winding mechanism, and the first drage part comprising a drag adjustment knob which adjusts a presing force of a drag pad in the first drag part and sets the upper limit of the winding torque;
a rotation adjustment shaft provided on the main rotation shaft across a fixing shaft; and
a second drag part which sets an upper limit of tension applied to the finishing line, the second drag part being provided between the rotation adjustment shaft and the reel body;
wherein the winding ring is rotated and the spool is rotated by pulling out the winding cord, the winding ring is rotated with the spiral spring in a rewinding direction after the fishing line is wound, and the winding cord is rewound around the winding ring with the one-way clutch without torque being transmitted to the spool.

2. The fishing reel according to claim 1, wherein the first drag part further comprises a drag disc provided coaxially with the main rotation shaft, and wherein a plurality of the drag pads are disposed opposite to the drag disc.

3. The fishing reel according to claim 1, wherein the spiral spring, power transmission member, and winding ring are combined in one unit.

* * * * *